G. W. BOWER.
CLAMPING EAR.
APPLICATION FILED MAY 27, 1921.

1,420,408.

Patented June 20, 1922.

Inventor:
George W. Bower,
by Albert E. Davis
His Attorney.

UNITED STATES PATENT OFFICE.

GEORGE W. BOWER, OF SCHENECTADY, NEW YORK, ASSIGNOR TO GENERAL ELECTRIC COMPANY, A CORPORATION OF NEW YORK.

CLAMPING EAR.

1,420,408.      Specification of Letters Patent.     Patented June 20, 1922.

Original application filed October 19, 1920, Serial No. 418,092. Divided and this application filed May 27, 1921. Serial No. 473,070.

*To all whom it may concern:*

Be it known that I, GEORGE W. BOWER, a citizen of the United States, residing at Schenectady, in the county of Schenectady, State of New York, have invented certain new and useful Improvements in Clamping Ears, of which the following is a specification.

The present invention relates to clamping ears, such as are used for trolley-line construction and the like, and has for its object to provide an improved structure and arrangement in apparatus of this character.

This application is a division of my application Serial Number 418,092, filed October 19, 1920.

Figure 1:
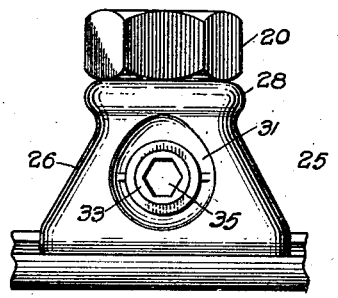
Figure 2:
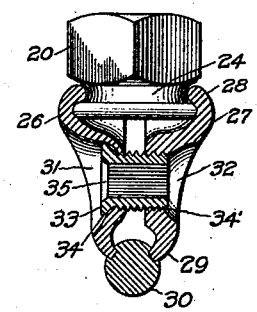
Figure 3:
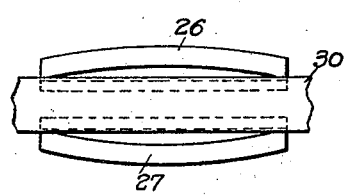
Figure 4:
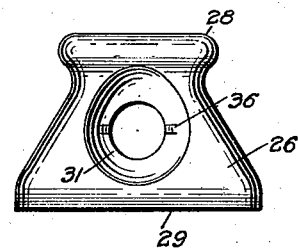
Figure 5:
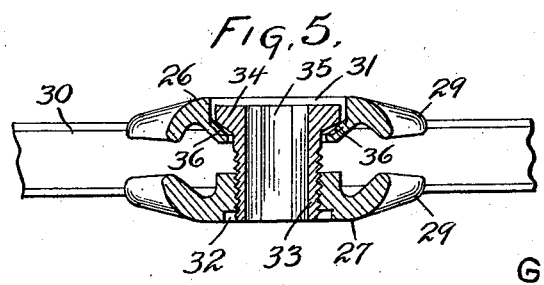

In the drawing Fig. 1 is a side elevation of a clamping ear embodying my invention; Fig. 2 is a transverse sectional view thereof; Fig. 3 is a bottom plan view of the ear, illustrating the manner in which it clamps with a trolley wire and Fig. 4 is a side view of one of the members of the clamping ear. Fig. 5 is a view, partly in plan and partly in section, showing the relative arrangement of parts of the device.

Referring to the drawing 20 indicates a supporting member provided with an annular groove 24, and swivelled in groove 24 is a trolley ear 25 embodying my invention. In the present instance supporting member 20 is shown as being in the form of a nut which may be threaded onto the end of a post or rod, the nut forming in substance an adapter. It is to be understood that nut 20 is to be taken as typical of any supporting member from which it is desired to suspend a trolley ear.

Trolley ear 25 comprises two clamping members 26 and 27 each formed at its upper edge with an inturned semi-circular flange 28 which fits in groove 24 and a flared-out lower end which presents an edge 29 for engagement with a groove in a trolley wire 30. Clamping member 26 is provided with a counter-sunk opening 31 having a smooth edge and clamping member 27 is provided with a counter-sunk opening 32 which is threaded to receive the threads on a clamping screw 33. Clamping screw 33 has at one end a head 34 located in the countersunk portion of opening 31 and after the screw has been inserted in openings 31 and 32 its other end is upset as indicated at 34′ so the screw cannot work out of the opening. This serves to make the trolley ear a complete unitary structure which cannot come apart during handling or shipping. Screw 31 is of sufficient length so that when screwed out of opening 32 as far as it will come, the clamping members 26 and 27 can be spread apart far enough to permit of flanges 28 being readily slipped over the end of supporting member 20 and edges 29 being slipped into the trolley wire grooves.

The head of screw 33 is not provided with a slot for manipulating the screw with an ordinary screw-driver, but instead is provided with a polygonal, axially-extending opening 35 adapted to receive a tool having a similar shaped end for turning it. With this arrangement the screw can be tightened with greater ease than with an ordinary screw-driver and there is no danger of the tool slipping out of the slot as in the case of a screw-driver. This is a matter of considerable importance from a practical standpoint as a workman in tightening up a trolley ear is often required to stand in an awkward position and usually on an overhead platform which makes the use of a screw-driver difficult. Also the clamping members can be drawn up tighter with such a tool than would be possible with an ordinary screw-driver. In this connection it will be noted that the trolley ear has no direct connection with any insulating means for it so that no matter how tight it is screwed up it cannot affect the insulation.

The head of screw 33 is cone-shaped as is also the counterbored portion of opening 31 and projecting from the wall of the counterbored portion of the opening are two diametrically opposed projections 36, the outer surfaces of which extend at an angle greater than that of the conical screw head. When the conical head is screwed down against these projections since it has a smaller angle than the projections, it will bind against them thus making the screw self-locking. At the same time the screw can tilt or rock on the projections 36 so that irrespective of the angle to the vertical which the clamping members take, which angle of course varies with the size of the trolley wire, the screw can stand straight relatively to the opening in clamping member 27.

As shown in Fig. 3 the edges 29 of the clamping members are bowed outwardly at their centers so that in tightening them on a trolley wire the corners take hold first. This arrangement insures that when the clamping members are tightened up they will engage the wire along their entire length.

It will be noted that the trolley ear is narrow in width and that by reason of the countersunk openings no part of the clamping screw projects beyond the confines of the ear. As a result it gives good clearances for the flanges of the trolley wheel and will not interfere with the wheel on curves. Furthermore, on account of the swivel joint between the trolley ear and the supporting member, the ear may be turned to any angle relatively to the support so as to make the ear conform to the direction of the trolley wire on curves or under other conditions which may be met with.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States, is:—

1. The combination with a supporting element having an annular groove, of a trolley ear comprising two clamping members each having a semi-circular flange which is located in said groove and an elongated edge for engagement with a trolley wire, and a screw having a polygonal opening for fastening said clamping members together.

2. A trolley ear comprising two clamping members, each having a semi-circular flange at one end, an elongated edge at the other end, and a counterbored opening, the opening in one of said members being threaded, and a screw which passes through the one opening and threads into the other, said screw having a head located in the counterbored portion of one opening and a polygonal opening to receive a tool for turning it.

3. A trolley ear comprising two clamping members, each having a semi-circular flange at one end, an elongated edge at the other end, and a counterbored opening, the opening in one of said members being threaded, a screw which passes through the one opening and threads into the other, said screw having a conical head, and the counterbored portion of one of said openings being provided with two diametrically opposed projections against which said head rests and on which it can rock.

4. A trolley ear comprising two clamping members, each having a semi-circular flange at one end, an elongated edge at the other end, and a counterbored opening, the opening in one of said members being threaded, and a screw which passes through the one opening and threads into the other, said screw having a conical head, the counterbored portion of one of said openings being provided with two diametrically opposed projections against which said head rests and on which it can rock, the angle of said conical head being less than that of the projections whereby the head locks thereon.

5. A trolley ear having edges for clamping engagement with a trolley wire, said edges being bowed out at their centers in opposite directions whereby when the same clamp a trolley wire, the ends of the edges engage it first.

6. A trolley ear comprising two members having opposed, elongated clamping edges, each of said edges being bowed outwardly at its center.

7. A trolley ear comprising two clamping members at least one of which has a counterbored opening, said members being adapted to clamp a supporting element and a wire, and a screw having a head located in the counterbored portion of the opening, said head being provided with a polgonal opening to receive a tool for turning it.

8. A trolley ear comprising two clamping members at least one of which has a counterbored opening, said members being adapted to clamp a supporting element and a wire, projections on the surface of the counterbored portion of said opening, and a screw having its head located in the counterbored portion of said opening in engagement with said projections.

In witness whereof, I have hereunto set my hand this 25 day of May, 1921.

GEORGE W. BOWER.